United States Patent [19]
Wehrle et al.

[11] Patent Number: 5,792,351
[45] Date of Patent: Aug. 11, 1998

[54] SPINNING FILTER SEPARATION SYSTEM FOR OIL SPILL CLEAN-UP OPERATION

[75] Inventors: John Wehrle, Greenbelt; Eugene C. Fischer, Stevensville; William P. Kenney, Annapolis; Joseph F. Korczynski; Thomas D. Gracik, both of Glen Burnie; Barbara F. Howell, Arnold; William Klemens, Severna Park, all of Md.

[73] Assignee: The United States of America as represented by the Secretary of the Navy, Washington, D.C.

[21] Appl. No.: 725,217

[22] Filed: Sep. 26, 1996

[51] Int. Cl.⁶ .................... B01D 21/26; B01D 63/16
[52] U.S. Cl. .................... 210/321.67; 210/323.2; 210/324; 210/330; 210/360.1; 210/380.1; 494/36
[58] Field of Search .................... 210/242.3, 322, 210/323.1, 323.2, 324, 321.6, 321.67, 330, 360.1, 380.1; 494/31, 36, 431, 32, 901

[56] References Cited

U.S. PATENT DOCUMENTS

| | | | |
|---|---|---|---|
| 1,553,141 | 8/1925 | Clark | 494/31 |
| 4,786,420 | 11/1988 | Dalessandro | 210/323.2 |
| 5,037,562 | 8/1991 | Tarves, Jr. | 210/321.67 |
| 5,149,432 | 9/1992 | Lavin | 210/380.1 |
| 5,286,379 | 2/1994 | Jackson | 210/901 |

*Primary Examiner*—David A. Reifsnyder
*Attorney, Agent, or Firm*—John Forrest; Jacob Shuster

[57] ABSTRACT

Oil spill polluted water is conducted under pressure in sequence through separator devices to collect and burn a polluted water mixture having its oil concentration increased by extraction of water therefrom during axial flow through the separator devices. Such water extraction is effected by sequential radial outflow through oil flow blocking filter walls of the separator devices in response to rotation thereof.

5 Claims, 2 Drawing Sheets

SPINNING FILTER SEPARATION SYSTEM FOR OIL SPILL CLEAN-UP OPERATION

BACKGROUND OF THE INVENTION

According to current technology, effective clean up of oil spills from the surface of ocean water is performed by an oil sweeper vessel within which oil contaminated water is collected for transport to remotely located on-shore equipment within which oil separation and disposal is performed. The processing of large quantities of oil polluted ocean water is accordingly time consuming as well as costly.

It is therefore an important object of the present invention to provide a less costly oil spill clean up system involving more rapid processing of large quantities of oil polluted ocean water.

SUMMARY OF THE INVENTION

In accordance with the present invention, oil polluted ocean water is processed at an oil spill location by continuous separation during pressurized flow of the water through at least two separator devices within which successive reduction in oil concentration is effected with respect to a separated portion of the water by its centrifugally induced filtered flow through porous membrane walls to correspondingly increase the oil concentration within the other remaining portion of water being processed. The first portion of the processed water when sufficiently reduced in oil concentration is discharged for return to the oil spill location, while the remaining portion is collected until a sufficient level of oil concentration therein is achieved to permit disposal thereof by burning at the oil spill site.

BRIEF DESCRIPTION OF THE DRAWING FIGURES

A more complete appreciation of the invention and many of its attendant advantages will be readily appreciated as the same becomes better understood by reference to the following detailed description when considered in connection with the accompanying drawing wherein:

FIG. 1 is a side elevation view with parts shown in section, of apparatus associated with the oil clean up system of the present invention; and FIG. 2 is a block diagram of the oil clean-up system embodying the apparatus shown in FIG. 1.

DETAILED DESCRIPTION OF PREFERRED EMBODIMENTS

Figure 1:
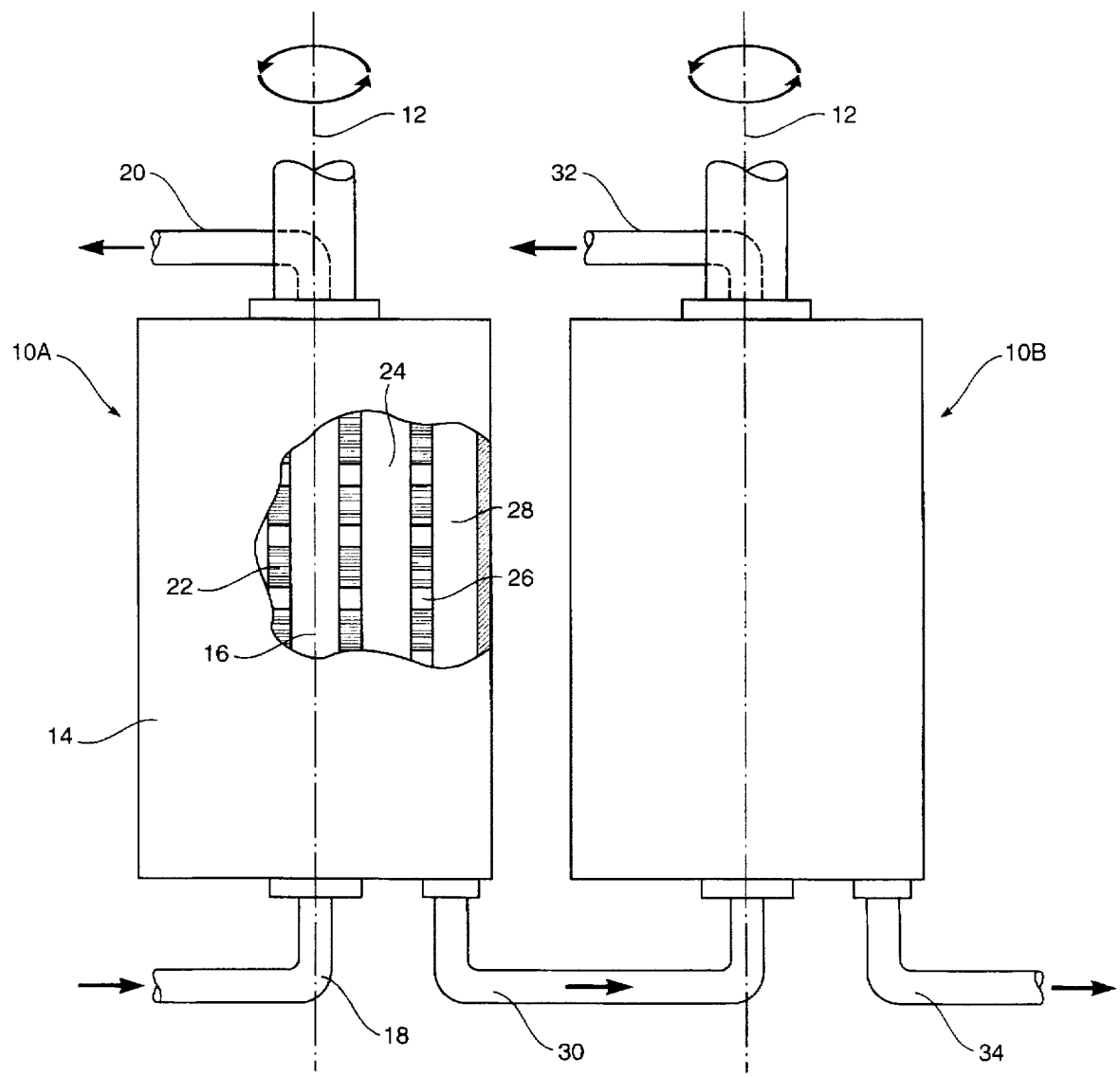

Referring now to the drawing in detail, FIG. 1 illustrates two separator devices 10A and 10B of similar construction associated with one embodiment of the present invention through which an oil spill clean up operation is performed. As shown, the separator devices are arranged in vertical parallel relation to each other for rotation of associated motor shafts 11 about axes 12 extending centrally through outer cylindrical housings 14 of the separator devices. An inner axial flow chamber 16 aligned with axis 12 is formed within each separator device to which axial flow of water under pressure as the fluent material being processed is conducted. Inflow to the inner chamber 16 of separator device 10A is conducted by conduit section 18 at the lower axial end of housing 14. Fluent material conducted through such axial flow chamber 16 is discharged from the upper axial end of housing 14 of separator device 10A through a conduit section 20.

The inner axial flow chamber 16 in each of the separator devices 10A and 10B is enclosed by a radially inner cylindrical porous wall 22 of a filtering arrangement. An annular chamber 24 is enclosed in surrounding relation to inner chamber 16 by a second cylindrical porous wall 26 radially spaced inwardly from the outer imperforate wall of the housing 14 to form a radially outer chamber 28 therein. Outflow from the bottom of chamber 28 in separator device 10A is transferred by conduit section 30 to the lower end of the inner axial flow chamber 16 of separator device 10B from which axial outflow is discharged at its upper axial end through conduit section 32. A continuous radial outflow through the filtering walls 22 and 26 in each of the separator devices 10A and 10B is thus established through conduit section 30 between chamber 28 in device 10A and the inner chamber in device 10B to its radially outer chamber so as to effect a successive reduction in concentration of a filter separated contaminant within the fluent material discharged from the lower end of the outer chamber of device 10B through conduit section 34, as shown in FIG. 1.

The radially inner filtering wall 22 of each separator device according to one embodiment is formed by a fluortex hydrophobic separation membrane with 50 µm pores therein which serves to prevent inflow of droplets of oil as the contaminant, larger than 50 µm, into the annular chamber 24 so as to thereby reduce oil concentration within the water being processed. A further reduction in oil concentration is then effected by inflow of the water being processed to chamber 28 through filtering wall 26 formed by a hydrophilic separation membrane with 2 µm pores therein. The water so processed by radial outflow through the porous separation membranes of filtering walls 22 and 26 in separator device 10A is again so processed by radial outflow through comparable separation membranes within separator device 10B to supply a portion of the processed water to discharge conduit section 34 with a desired reduced concentration of oil therein. In order to maintain a proper continuous radial outflow from chambers 16 and 24 respectively through the separation membranes of the filtering walls 22 and 26 without clogging, such chambers of the separator devices 10A and 10B are rotated through the motor shafts 11 about the axes 12 thereof to centrifugally enhance the radial outflow through the filtering walls. The portions of the processed water mixtures respectively leaving the separator devices 10A and 10B through conduit sections 20 and 32 are correspondingly increased in oil concentration to an extent accommodating on-site disposal thereof by burning within a furnace after being collected within a reservoir tank or the like.

Figure 2:
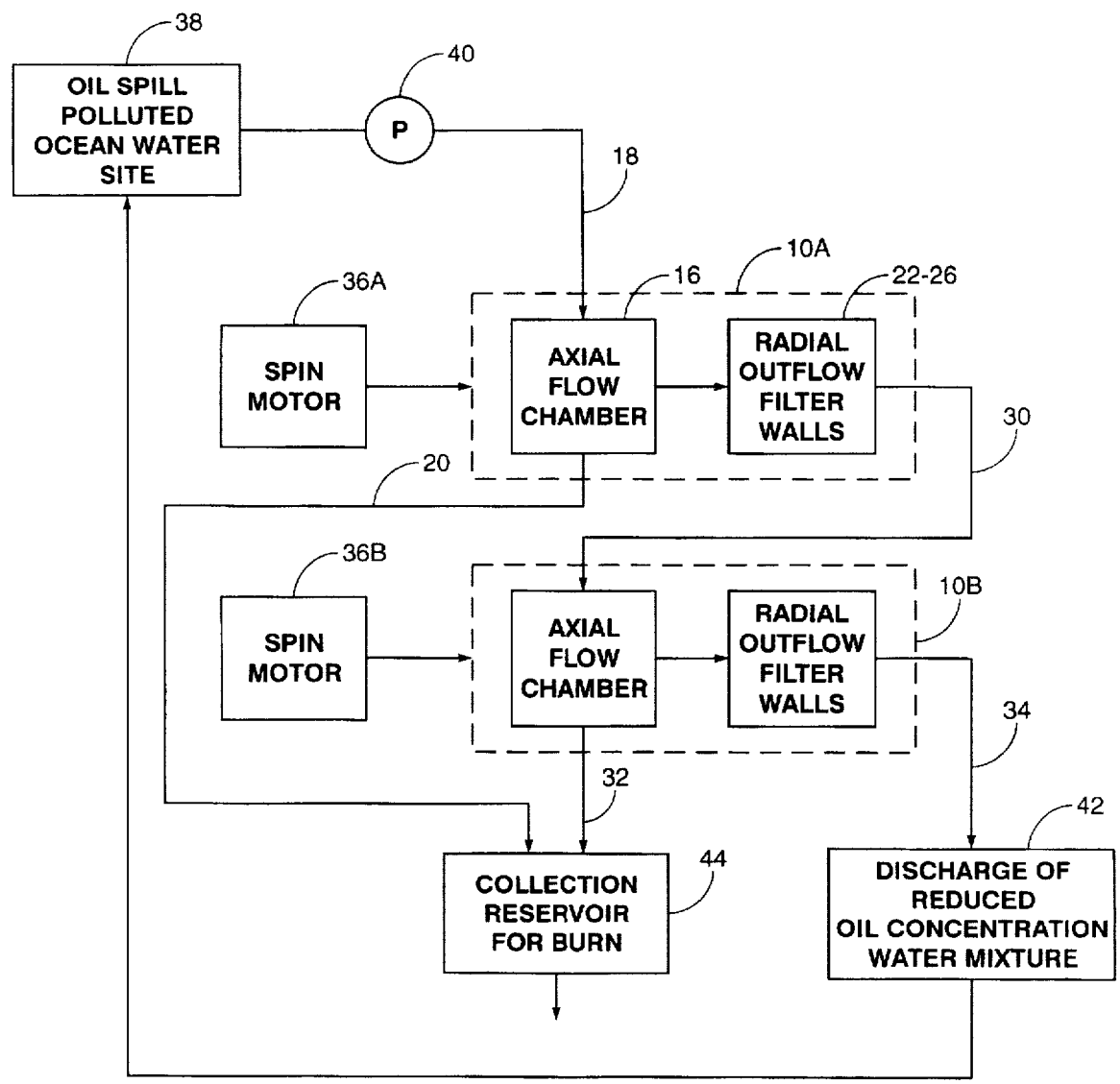

The oil spill clean up operation hereinbefore described in connection with the apparatus illustrated in FIG. 1, is summarized by reference to FIG. 2 diagramming the separator devices 10A and 10B having their chambers 16 and 24 rotated by spin motors 36A and 36B through shafts 11 to centrifugally induce radial outflow as aforementioned as part of a system for clean-up of water polluted at an oil spill site or location 38. The polluted water from such location 38 is fed under pressure by pump 40 to the separator device 10A through conduit section 18 for axial flow through chamber 16 therein. The successively reduced concentration of oil within the portion of the processed water delivered through conduit section 34 from separator device 10B is discharged, as denoted in FIG. 2 by reference numeral 42, for return of sufficiently purified water to the oil spill site 38. The other portion of the processed water is continuously fed by conduit sections 20 and 32 from the inner chambers 16 of the separator devices for a sufficient period of time to a collection reservoir 44 within which the increased concentration of oil therein becomes high enough to permit on-site furnace combustion thereof.

Obviously, other modifications and variations of the present invention may be possible in light of the foregoing teachings. It is therefore to be understood that within the scope of the appended claims the invention may be practiced otherwise than as specifically described.

What is claimed is:

1. A system for clean up of an oil spill within polluted water at an oil spill site, comprising: at least two separator devices, each of said separator devices having an inner chamber through which axial flow of the polluted water is conducted, a radially outer chamber and filtering means enclosing said chambers for conducting therefrom radial outflow of a filtered portion of the polluted water during said axial flow thereof through the inner chambers; pump means for inducing said axial flow of the polluted water under pressure from the oil spill site through the inner chamber of one of the separator devices; flow transfer means conducting said radial outflow from the radially outer chamber of said one of the separator devices for providing said axial flow into the inner chamber of the other of the separator devices; motor means connected to the filtering means of said separator devices for rotation of said chambers therein about axes substantially parallel to said axial flow of the polluted water to centrifugally control said radial outflow of the filtered portion of the polluted water through the filtering means; reservoir means connected to the inner chambers of the separator devices for collecting the polluted water increased in oil concentration by said radial outflow during said axial flow through the inner chambers; and means connected to the radially outer chamber of the other of the separator devices for discharge of said filtered portion of the polluted water to the oil spill site with oil concentration therein progressively reduced by said radial outflow in sequence from the inner chambers of the separator devices.

2. A system for clean up of an oil spill within polluted water at an oil spill site, comprising: at least two separator devices, each of said separator devices having an inner chamber through which axial flow of the polluted water is conducted, a radially outer chamber and filtering means enclosing said chambers for conducting therefrom radial outflow of a filtered portion of the polluted water during said axial flow thereof through the inner chambers; pump means for inducing said axial flow of the polluted water under pressure from the oil spill site through the inner chamber of one of the separator devices; flow transfer means conducting said radial outflow from the radially outer chamber of said one of the separator devices for providing said axial flow into the inner chamber of the other of the separator devices; motor means connected to the filtering means of said separator devices for rotation of said chambers therein about axes substantially parallel to said axial flow of the polluted water to centrifugally control said radial outflow of the filtered portion of the polluted water through the filtering means; reservoir means connected to the inner chambers of the separator devices for collecting the polluted water increased in oil concentration by said radial outflow during said axial flow through the inner chambers; and means connected to the radially outer chamber of the other of the separator devices for discharge of said filtered portion of the polluted water to the oil spill site with oil concentration therein progressively reduced by said radial outflow in sequence from the inner chambers of the separator devices, the filtering means including radially spaced walls separating the inner and radially outer chambers, said walls being made of porous membranes having microfilter pore openings through which the outflow of said portion of the water is conducted.

3. A system for clean up of water polluted by oil therein at an oil spill location, comprising: at least two separator devices; filter means within each of said separator devices for separation of the water conducted therethrough into two portions; pump means for inducing flow of the water from said oil spill location in sequence through the separator devices during which concentration of oil within one of said two portions is progressively reduced by passage through the filter means; reservoir means connected to said separator devices for collecting the other of said two portions of the water respectively from each of the separator devices for disposal of the oil concentrated within said other of the two portions of the water; and motor means connected to the filter means of the separator devices for rotation thereof to centrifugally control said separation of the water into the two portions by restricted flow through the filter means which includes spaced porous membranes having graduated sized pores through which said passage of the water is conducted.

4. In combination with at least two separator devices having underflow outlets through which a contaminant is to be extracted from polluted water, a clean-up system including: means for conducting the polluted water under pressure to one of the separator devices; rotating means for centrifugally inducing radial outflow from each of the separator devices; means for filtering the radial outflow of the water during conduction through each of the separator devices; means transferring the radial outflow from said one of the separator devices to the other of the separator devices for continued filtering of the polluted water therein; means for discharging the radial outflow of the polluted water from said other of the separator devices with reduced concentration of the contaminant therein; and disposal means for collecting the polluted water with increased concentration of the contaminant therein from each of the separator devices through the underflow outlets associated therewith.

5. The system as defined in claim 4 wherein said contaminant is oil.

* * * * *